United States Patent [19]

Merkel

[11] Patent Number: 4,842,162
[45] Date of Patent: Jun. 27, 1989

[54] APPARATUS AND METHOD FOR DISPENSING FLUID MATERIALS USING POSITION-DEPENDENT VELOCITY FEEDBACK

[75] Inventor: Stephen L. Merkel, Bay Village, Ohio

[73] Assignee: Nordson Corporation, Westlake, Ohio

[21] Appl. No.: 164,536

[22] Filed: Mar. 7, 1988

Related U.S. Application Data

[63] Continuation of Ser. No. 32,048, Mar. 27, 1987, abandoned.

[51] Int. Cl.$^4$ .......................... G01F 9/00; G01F 1/86; B67D 5/08
[52] U.S. Cl. .......................... 222/1; 222/55; 222/559; 137/8; 137/487.5; 137/805; 137/831; 239/69; 239/533.1; 239/583; 91/361; 91/364
[58] Field of Search .................. 222/1, 52, 55, 61, 63, 222/71, 146.5, 504, 559; 901/42, 43; 137/8, 487.5, 805, 829, 831; 239/67, 69, 533.1, 583; 91/1, 361, 364

[56] References Cited

U.S. PATENT DOCUMENTS

| | | |
|---|---|---|
| 3,015,768 | 1/1962 | Hornfeck et al. . |
| 3,666,141 | 5/1972 | Ma et al. . |
| 3,943,443 | 3/1976 | Kimura et al. ............... 324/163 |
| 4,133,511 | 1/1979 | Hartmann et al. . |
| 4,301,944 | 11/1981 | Lestradet . |
| 4,430,886 | 2/1984 | Rood . |
| 4,472,967 | 9/1984 | Godfrey . |
| 4,478,775 | 10/1984 | Endo et al. . |
| 4,613,059 | 9/1986 | Merkel . |
| 4,662,540 | 5/1987 | Schroter . |
| 4,667,852 | 5/1987 | Siemann . |
| 4,678,100 | 7/1987 | Gelinas et al. . |
| 4,700,205 | 10/1987 | Rich et al. . |

FOREIGN PATENT DOCUMENTS

| | | |
|---|---|---|
| 0098719 | 1/1984 | European Pat. Off. . |
| 0163069 | 12/1985 | European Pat. Off. . |
| 3109303 | 3/1982 | Fed. Rep. of Germany . |
| 276064 | 10/1982 | Fed. Rep. of Germany . |
| 430837 | 8/1967 | Switzerland . |
| 1519954 | 8/1978 | United Kingdom . |
| 2074240 | 10/1981 | United Kingdom . |
| 8603855 | 7/1986 | World Int. Prop. O. . |

OTHER PUBLICATIONS

Brochure: ASEA Robotics, Inc., Industrial Robot System For Gluing and Sealing (date unknown).
Omega Pressure and Strain Measurement Handbook, p. A-22.

Primary Examiner—Michael S. Huppert
Assistant Examiner—Edward S. Ammeen
Attorney, Agent, or Firm—Wood, Herron & Evans

[57] ABSTRACT

Apparatus and method for dispensing fluid materials wherein the fluid is discharged from a nozzle at a rate controlled by a metering valve having a seat and a stem moveable with respect to the seat to modulate the flow. A servo-actuator connected in a feedback control loop is used to position the valve stem with respect to its seat in accordance with a control signal. The control signal is derived in accordance with the difference between a driving signal representing a desired flow rate and the sum of a pair of feedback signals. One feedback signal represents the actual flow rate while the other feedback signal is correlated to both the relative velocity and position of the stem with respect to the seat. The position-dependent velocity signal is generated by a transducer comprising a magnet and a coil influencable by the field of the magnet as the magnet and coil move relative one another. For any given velocity, the magnitude of the position-dependent velocity signal is greater when the stem and seat are close together than when they are further apart so that as the valve closes, the amount of feedback increases.

14 Claims, 2 Drawing Sheets

APPARATUS AND METHOD FOR DISPENSING FLUID MATERIALS USING POSITION-DEPENDENT VELOCITY FEEDBACK

CROSS REFERENCE TO RELATED APPLICATION

This case is a continuation of U.S. patent application Ser. No. 07/032,048 filed Mar. 27, 1987 entitled Apparatus and Method For Dispensing Fluid Materials Using Position-Dependent Velocity Feedback, abandoned.

FIELD OF THE INVENTION

The present invention relates to a system for controlling the flow of fluids. More particularly, the invention relates to an apparatus and method for dispensing fluid materials at a controlled rate.

BACKGROUND OF THE INVENTION

In many applications, it is desirable to control the flow of a fluid precisely and to have the ability to change flow control parameters rapidly. Such control may be desired either to maintain a given flow rate in the face of perturbations such as changes in the fluid's flow characteristics or supply pressure or, to effect similarly rapid changes in the flow rate such as may be required to account for changes in the relative speed between the dispenser and a workpiece onto which the fluid is being dispensed.

When dispensing viscous fluids such as certain lubricants, adhesives, sealants and the like, it is often necessary to apply the material to the surface of a workpiece in a bead containing a desired amount of material per unit length In high production processes or where the bead of material must be positioned with accuracy, robot arms are often used to apply the material by rapidly guiding a dispensing nozzle in a programmed pattern over the surface of the workpiece. Depending on the application, the fluid being dispensed may either be projected some distance from the nozzle in a high velocity stream or extruded from the nozzle at lower velocity with the nozzle located closer to the workpiece. In either case, the amount of material applied per unit of lineal distance along the bead will vary according to both the flow rate of material discharged from the dispensing nozzle and the speed of the nozzle with respect to the workpiece.

In the automotive industry, such a process is used to apply a uniform bead of sealant around the periphery of the inside surface of automobile doors before joining the inside panel to the door. Along long, straight portions of the pattern, a robot arm can move the nozzle quickly. However, where the desired bead pattern changes direction abruptly, such as around the corners of a door panel, the robot arm must be slowed down to achieve a required bead positioning accuracy. It can be appreciated that if the flow rate of the dispensed fluid material is held fixed, the amount of material in the applied bead will increase as the robot arm is decelerated to negotiate changes in direction and will decrease as the robot arm is accelerated. Likewise, changes in the fluid supply pressure or changes in the viscosity of the fluid material will tend to disrupt control over the size of the bead.

An apparatus and method which effectively addresses these difficulties is fully described in co-pending U.S. Patent Application S/N 06/924,940, assigned to the same assignee as the present invention and expressly incorporated herein by reference. That application discloses, inter alia, a fluid dispensing method and apparatus wherein a servo actuator drives a variable fluid metering valve located in close proximity to a fluid discharge nozzle. The valve is a needle valve comprising a valve seat and a stem moveable relative the seat to vary the flow through the seat. A pressure sensor at the nozzle generates a signal correlated to the instantaneous flow rate of the dispensed fluid. Control over flow is achieved by connecting the dispenser in a closed-loop system in which the actuator is driven by a control current derived in accordance with the difference between the flow rate signal and a driving signal representing a desired flow rate In robotic applications, the driving signal is preferably related to a toolspeed signal emanating from the controller of the robot carrying the dispenser so that the control current will vary as required to maintain a uniform bead of fluid material even during relatively rapid changes in the relative speed between the dispenser and the workpiece onto which material is dispensed.

The stem-and-seat needle valve arrangement used in the device disclosed in the above-referenced patent application falls within a class of valves which may be described as variable-area flow restrictors. Other valves in this class include gate valves and shutter valves. Valves in this class modulate flow by varying an area through which flow may take place such as the area between a valve stem and its seat.

It is an inherent characteristic of such valves that, as the valve closes, its sensitivity increases. That is, for a given percentage of actuation, the corresponding percentage change in the flow through the valve will be greater when the valve is nearly closed than when it is more fully open. This is due to geometrical factors in that a given amount of actuation results in a greater change in flow area when the valve operates near the "closed" end of its range than when the valve operates more toward the "open" end of its range.

When a variable-area flow restrictor type valve is employed as a metering valve in a closed-loop dispensing system which must operate accurately and rapidly over a range of flow rates, including flow rates where the metering valve is nearly closed, the above characteristic limits system performance. Since the valve is quite sensitive when nearly closed, system stability is decreased when the metering valve is so positioned. This limits the maximum gain at which the system can operate which, in turn, limits system response time so that when the valve is operating at the more open end of its range, response time is slower than required to maintain stability when the valve is operating at the more closed end of its range.

SUMMARY OF THE INVENTION

In view of the foregoing, it is an objective of the present invention to provide a method and apparatus for dispensing fluid materials which provide for stable operation over the full operating range of flow rates and wherein the response time when the valve is more fully open is not limited by requiring the loop gain to be set low in order to maintain stability at times when the valve is nearly closed.

It is a further objective of the invention to provide such a method and apparatus wherein stability is maintained over the full operating range of the valve by increasing the amount of feedback as the valve closes and rapid response is maintained by decreasing the amount of feedback as the valve opens.

It is still a further object of the present invention to increase the amount of feedback as the valve closes and decrease the amount of feedback as the valve opens by providing a position-dependent velocity signal correlated to both the velocity at which the valve opens and closes and the position of the valve.

It is a further object of the present invention to provide such a method and apparatus wherein the magnitude of the position-dependent velocity signal is zero when the valve is not moving and increases as the speed at which the valve opens or closes increases and is further such that, for any given velocity, the magnitude of said position-dependent velocity signal is greater when the valve is operating near the "closed" end of its range than when it is more fully open.

It is a further object of the invention to provide a position-dependent velocity signal which varies in polarity according to the direction of travel of the valve and which can be used to tend to oppose movement of the valve in both directions.

It is yet another object of the present invention to provide such a method and apparatus whereby the position-dependent velocity feedback signal is generated using a magnet moveable with respect to a coil to influence the coil so that the magnet and coil move toward one another as the valve closes and away from one another as the valve opens.

To these ends, a preferred embodiment of the invention includes a dispenser for viscous fluids connected in a feedback control loop. The dispenser has an electropneumatic servo actuator connected to a fluid metering valve. The valve has an inlet connectable to a supply of fluid to be dispensed and an outlet connected to a dispensing nozzle. Interposed between the inlet and the outlet is a valve seat having a central orifice and a valve stem mateable with the seat and axially moveable with respect thereto. The valve stem is connected to the servo actuator such that the stem is moved according to the electrical signal applied to the servo actuator. Movement of the stem toward or away from the seat varies the effective flow area through the orifice to decrease or increase, respectively, the flow through the orifice. The actual rate of flow is measured by a flow rate sensor located at the nozzle. The flow rate sensor generates a flow rate signal which is used as a first feedback signal in the feedback control loop. The first feedback signal is added to a second feedback signal, to be described, and their sum is compared with a driving signal representing a desired flow rate in order to derive the control signal supplied to the servo actuator.

The invention contemplates the use of a second feedback signal in the form of a position-dependent velocity signal to be added to the first feedback or flow rate signal as noted above. This signal is correlated to both the velocity and the position of the valve stem with respect to the seat as to mitigate the adverse impact of the high sensitivity of the metering valve on system stability when the valve stem is operating close to its seat while at the same time not slowing system response time when the valve is operating at more fully open positions and hence, is less sensitive.

This is accomplished by using the position-dependent velocity signal to increase the magnitude of the feedback signal when the metering valve stem is moving in close proximity to its seat. The position-dependent velocity signal is such that its magnitude is zero when the stem is not moving relative the seat. Its magnitude increases with increasing stem velocity and decreases with decreasing stem velocity Further, for any given velocity, the magnitude of the position-dependent velocity signal increases as the distance between the stem and seat decreases. Conversely, for any given velocity, the magnitude of the signal decreases as the distance between the stem and seat increases. This permits the design of a dispensing system which avoids any undue limitation on system response time when the valve is less sensitive and the system inherently more stable. The polarity of the position-dependent velocity signal reverses as the direction of travel of the stem relative the seat reverses and is applied as to always oppose motion of the valve, whether it is opening or closing.

A position-dependent velocity signal embodying the above characteristics is generated by mounting a magnet in a position fixed relative to the valve stem of the metering valve and a coil in a position fixed relative to its valve seat so that the magnet and coil move relative to one another in the same manner that the stem and seat move relative to one another. As the flux field of the moving magnet is cut by the coil, a voltage will appear across the coil. The polarity of this voltage will vary according to the relative direction of travel. Further, the magnitude of the voltage will vary as a function of both velocity and position. When there is no relative movement between magnet and coil, the magnitude of the signal will be zero since there will be no magnetic flux being cut by the coil. When movement takes place, the magnitude of the signal varies directly with velocity in accordance with changes in the rate at which the magnetic flux is cut by the coil. Thus, the signal will increase when the relative velocity between magnet and coil increases and decrease when it decreases. The magnitude of the signal also varies inversely with the distance between the stem and seat. When the stem is close to the seat, the magnet is close to the coil. Because the flux lines of the magnet are more closely spaced in close proximity to the magnet and less closely spaced further away, the magnitude of the signal, for any given velocity, will be greater when the seat is close to the stem than when it is further away. Thus, the voltage across the coil is dependent on both the velocity and distance between the stem and seat in precisely the manner described above.

DETAILED DESCRIPTION OF THE INVENTION

Figure 1:
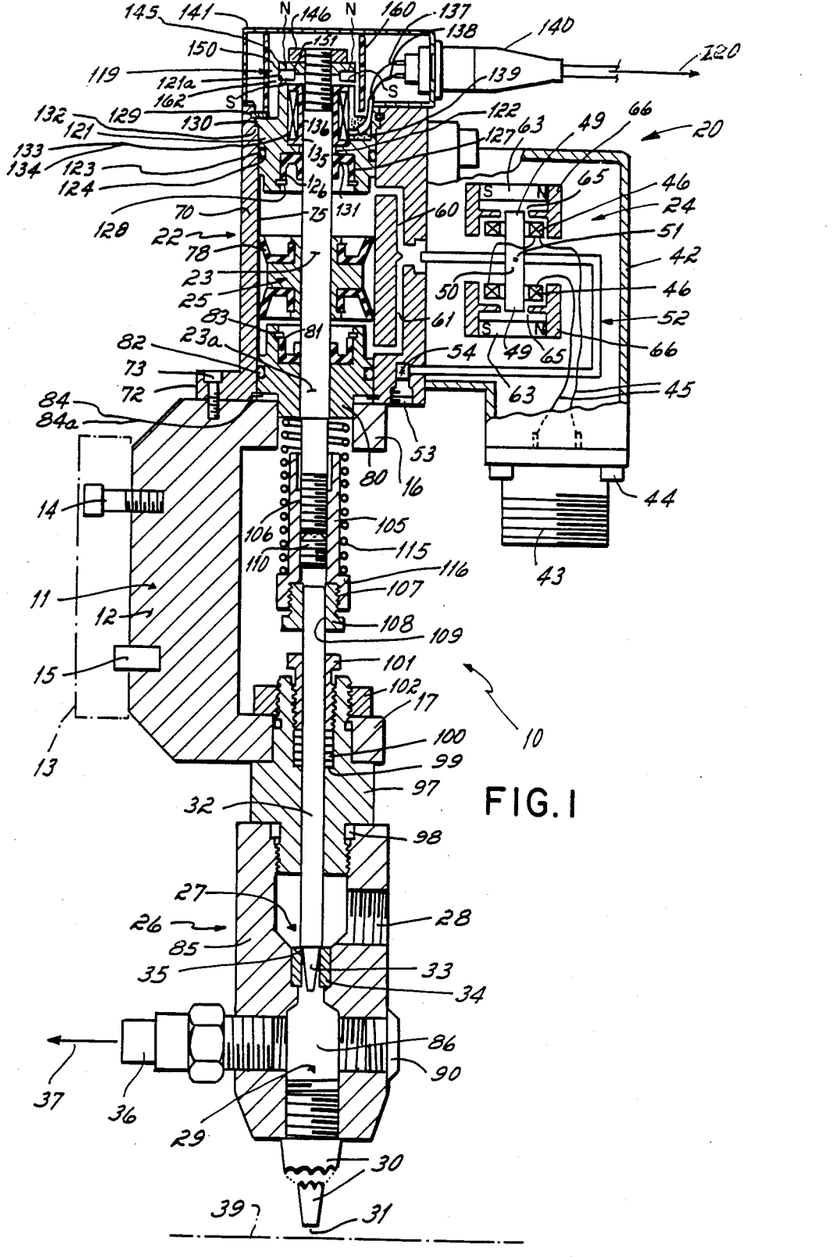
FIG. 1 is a schematic cross sectional view illustrating a preferred embodiment of a dispensing apparatus constructed according to the invention.

Referring now to FIG. 1 a preferred embodiment of a dispensing gun 10 constructed according to the invention is shown. Gun 10 includes a C-shaped frame 11 having a mounting plate 12 adapted to be secured to the tool mounting face 13 of a robot arm (not shown) by means of one or more cap screws 14 and alignment pins 15. Frame 11 is preferably constructed of a rigid, lightweight material such as aluminum alloy and further includes, extending outwardly from mounting plate 12, an upper portion 16, and an opposed lower portion 17.

The upper portion 16 of frame 11 carries an electro-pneumatic servo actuator 20 which may consist of any of a number of types of compact, light weight linear actuators offering rapid response. Preferably, actuator 20 comprises a double-acting air cylinder 22 having a reciprocable piston rod 23 whose extension is controlled by an electrically actuated pneumatic servovalve 24 according to the pressure balance across a piston 25 affixed to piston rod 23. Servovalve 24 is disposed to the side of air cylinder 22 (as shown). The lower portion 17 of frame 11 carries a metering valve assembly 26 having a needle valve 27 located between a fluid inlet 28 and a dispensing nozzle 29 which includes a nozzle end 30 threadably connected thereto. Nozzle end 30 has an outlet 31.

For best control, needle valve 27 is located as close to nozzle 29 as is practical. Valve 27 includes a valve stem 32 having a generally conically tapered end 33 and a valve seat 34 having a matingly tapered upper shoulder 35. Valve stem 32 is connected to piston rod 23 so that the position of its conical end 33 relative to valve seat 34 and hence, the flow rate of fluid discharged from nozzle 29, is controlled in accordance with the electrical input of electro-pneumatic servovalve 24.

A flow rate sensor 36 generates an electrical flow rate signal 37 correlated to the rate of flow of fluid discharged from nozzle 29. Preferably, flow rate sensor 36 comprises a pressure sensor located just downstream of needle valve 27 in the wall of nozzle 29. As will be described in further detail below, flow rate signal 37 is preferably used as a first feedback signal in a feedback loop in which gun 10 is connected to control the rate of flow of fluid dispensed from nozzle 29 in accordance with a driving signal representing a desired flow rate. In robotic applications, a driving signal which varies with the relative speed between nozzle 29 and the workpiece 39 and which is supplied by the robot controller can be used to accurately control the amount of fluid material per unit length contained in the bead deposited on the surface of the workpiece 39 by dispenser 10.

Linear actuator 20 may incorporate any of a number of suitable types of fast-responding, electrically-actuated servovalves including jetpipe, nozzle-and-flapper, or spool types. The present invention does not reside in the details of the construction of servovalve 24 such being within the purview of those skilled in the art. The servovalve is not described in complete detail.

In the preferred embodiment illustrated in FIG. 1, actuator 20 comprises a jet-pipe electro-pneumatic servovalve 24 which operates double-acting air cylinder 22. Servovalve 24 includes a housing 42 which supports a threaded, electrical connector 43 secured thereto by screws 44. Wired to connector 43 by way of leads 45 are a pair of series-connected coils 46 which surround opposing ends 49 of an armature 50 which is mounted to pivot about a pivot point 51. A hollow, inverted U-shaped jet pipe 52 has one leg connected to a regulated air supply (not shown) of about 100 PSI nominal pressure through a threaded inlet 53 in air cylinder 22 by way of a removeable particulate trapping screen or filter 54. The opposite leg of jet-pipe 52 is secured near its center to armature 50 so that when armature 50 is pivoted clockwise by energizing coils 46 at one polarity, the flow emanating from jet pipe 52 is diverted toward a first port 60 which communicates with the space above the piston. Similarly, when coils 46 are energized in the opposite polarity, armature 50 pivots counter-clockwise to direct the flow from jet pipe 52 toward a second port 61 which opens to the space beneath the piston 25 of air cylinder 22. In either polarity, the degree of the deflection of jet pipe 52 and hence, the pressure in ports 60 and 61 is proportional to the magnitude of the control current flowing in coils 46. Armature 50 is spring centered and magnetically biased such that when coils 46 are in a de-energized state, jet pipe 52 is centered in a neutral position as shown so that the pressures in ports 60 and 61 tend to be equally balanced. Magnetic bias is provided by a pair of permanent magnets 63 polarized as shown. Each magnet 63 which communicates with the armature field by way of a flux across air gaps 65. This flux is conducted to gaps 65 by way of four magnetically permeable members 66 arranged as shown.

Double acting air cylinder 22 includes an aluminum alloy cylinder body 70, having a lower flange 72 which is used to secure the body 70 of air cylinder 22 to the upper portion 16 of frame 11 using cap screws 73. Cylinder body 70 includes first and second ports 60, 61, threaded air supply inlet 53, filter 54 as well as an axial cylinder bore 75. Received within bore 75 and connected to piston rod 23 is a piston 25 fitted with a pair of opposed cup seals 78. The space within bore 75 located above piston 25 communicates with first port 60 while the space beneath piston 25 is connected to second port 61. The direction and speed at which piston 25 drives needle valve 27 depends upon the differential pressure between ports 60 and 61 which appears across piston 25. As explained above, this pressure differential is determined by the deflection of jet pipe 52 due to the control current flowing in coils 46.

Piston 25 is retained within cylinder bore 75 at the lower end thereof by a cap 80 through which passes the lower portion 23a of piston rod 23. To prevent air leakage, cap 80 is provided with an internal cup seal 81 in the area of piston rod 23 and an external 0-ring seal 82 between the outside surface of cap 80 and cylinder bore 75. Cup seal 81 is retained within cap 80 by a snap ring 83. Cap 80 is itself retained in the end of cylinder bore 75 by a snap-ring 84 which engages a groove 84a cut in the lower portion of the wall of cylinder body 70. The structure disposed at the upper portion of cylinder body 70 which is of key importance to the present invention will be described later.

Metering valve assembly 26 includes a rigid, non-resilient valve body 85 constructed as shown in FIG. 1, preferably of metal. The lower end of valve body 85 contains a nozzle passage 86 whose lower end is threaded to accept a flow restricting nozzle end 30 of a desired configuration and having a discharge outlet 31. Passage 86 is intersected radially by one or more threaded holes, one of which receives flow rate sensor 36 and the others of which are sealed by means of plugs 90. Located immediately upstream of nozzle 29 and as closely adjacent thereto as practicable, valve body 85 houses needle valve 27 which, as previously noted, comprises a valve seat 34 and a valve stem 32 whose conical end 33 is mateable therewith. Valve stem 32, by virtue of its being connected to piston rod 23 in the manner to be described as moveable axially toward end away from valve seat 34 under the control of servo-actuator 20. For long life, both valve stem 32 and valve seat 34 are preferably fabricated of a hard material such as sintered tungsten carbide. A fluid supply inlet 28 enters valve body 85 upstream of needle valve 27. Inlet 28 is threaded so that a hose can be attached to a pressurized supply (not shown) of the fluid material to be dispensed.

Valve body 85 threads onto the lower end of a bonnet 97 and is sealed with respect thereto by means of an O-ring seal 98. Bonnet 97 includes an internal packing gland 99 which holds a plurality of annular PTFE packing seals 100. Seals 100 are retained in sealing but non-binding compression about valve stem 32 by means of an adjustable gland nut 101 threaded into the top of bonnet 97. To attach metering valve assembly 26 to frame 11, bonnet 97 is received by the extending lower portion 17 of frame 11 and secured thereto at a desired angular orientation by means of a locknut 102. This feature is useful where, for example, it is found that the fluid supply hose (not shown) which connects to fluid inlet 28 interferes with some structure in a given application. Locknut 102 can then be loosened and valve body 85 rotated to another angular position to avoid the interference, if possible.

Metering valve assembly 26 is connected to the piston rod 23 of actuator 20 by means of a coupling 105 having a threaded axial bore 106 into which the lower end of piston rod 23 is threaded. The lower end of coupling 105 carries a threaded recess 107 which receives a bushing 108 which has an axial bore 109 into which the upper end of valve stem 32 is received and secured by means of a press fit. Coupling 105 is prevented from unthreading from piston rod 23 by an Allen head type locking screw 110 which is threaded into bore 106 into secure pressure engagement with the end face of piston rod 23 as shown.

To provide for fail-safe operation, gun 10 is provided with a compression spring 115 operable to close valve 27 in the event the control signal or air supply to actuator 20 is interrupted in order to avoid an uncontrolled flow of fluid from gun 10. Spring 115 is compressed between cap 80 and an annular shoulder 116 provided on coupling 105.

Flow rate sensor 36 may comprise any suitable sensor capable of generating a flow rate signal 37 indicative of the rate of flow of the fluid dispensed from nozzle 29. The flow of a viscous newtonian fluid at low Reynolds numbers is substantially linearly proportional to the pressure drop across a nozzle or tubular restriction placed in the flow path. Accordingly, sensor 36 may comprise a strain gauge pressure transducer operably disposed to sense the instantaneous fluid pressure at a location inside passage 86 immediately downstream of needle valve 27 to sense the pressure drop across nozzle 29. One pressure transducer suitable for this purpose is model A205 manufactured by Sensotec of Columbus, Ohio.

According to the invention, dispensing gun 10 also includes a transducer assembly 119 for generating a position-dependent velocity signal 120. Transducer assembly 119 includes an upper cap 121 made of soft steel or other magnetically permeable material disposed atop cylinder body 70 as shown.

Upper cap 121 includes an axial bore 122 through which the upper portion of piston rod 23 passes. Further, upper cap 121 carries a O-ring 123 in an outer annular groove 124 for sealing bore 75 from air leakage. Air leakage about piston rod 23 is avoided by means of a cup seal 126 disposed in a recess 127 in cap 121 and retained therein by a snap ring 128. Cap 121 is held inside cylinder body 70 by means of a snap ring 129 which is installed above a small outwardly projecting flange 130 on cap 121. Flange 130 is received within a stepped recess 132 in cylinder body 70 to prevent cap 121 from slipping downward into bore 75. The upper side of cap 121 includes a cylindrical well 133 whose longitudinal axis is aligned with that of bore 75 and piston rod 23. Between well 133 and recess 127, cap 121 includes an inward projection 131 having a sufficiently large cross-sectional area to provide a good magnetic path. The air gap between projection 131 and piston rod 23 should be kept to a few thousandths of an inch or less.

Disposed within well 133 is a coil 134 wound on bobbin 135 made of plastic material such as DELRIN a reinforced nylon made by the Dupont Company of Wilmington Del.

Bobbin 135 has an axial bore 136 which is also axially aligned with piston rod 23. Bobbin 135 has sufficient lubricity and bore 136 has sufficient clearance, that piston rod 23 is free to reciprocate axially therethrough without significant frictional drag. Coil 134 consists of 1000 turns of #38 A.W.G. magnet wire wound in a single continuous length upon bobbin 135. The end leads 137, 138 of coil are routed away from bobbin 135 through a small reservoir 139 in cap 121. Reservoir 139 is filled with electrical potting compound for mechanical protection of leads 137 and 138 which are electrically connected by soldering or other suitable means to the terminals of a two piece plug-type electrical connector 140. Connector 140 is mounted in the wall of a protective metallic housing 141 which is secured to cylinder body 70 by screws or other conventional means (not shown).

Threaded onto the upper end of piston rod 23 is a ring shaped armature 145 made of soft steel or other magnetically permeable material. Armature 145 is prevented from loosening by means of a lock-nut 146 which is threaded onto piston rod 23 behind armature 145 as shown. A permanent ring shaped magnet 150 of Alnico, ceramic or ceramic plastic magnetic material is attached to armature 145 on the side of armature 145 which faces coil 134. Magnet 150 is polarized as shown in FIG. 1 and has a magnetic flux density of about 2,200 gauss. Preferably, armature 145 includes a circumferential step 151 about its periphery mateable with the inner diameter of magnet 150. Magnet 150 is secured to armature 145 at step 151 using a thin layer of epoxy or other suitable adhesive (not shown). For mechanical protection, the leads 137, 138 of coil 134 are separated from reciprocable components such as magnet 150, armature 145, locknut 146 and piston rod 23 by interposing a cylindrical shroud 160 of insulating material between them. Shroud 160 need not be rigidly secured to any surrounding structure so long as it is retained within the confines of housing 141 as shown in such a way that separation of leads 137, 138 from these moving components is assured, in order to avoid pinching or shorting of leads 137, 138.

In light of the foregoing, it can be appreciated that coil 134 remains at all times fixed in its position with respect to valve seat 34. Likewise, magnet 150 remains at all times fixed in position with respect to the conical end 33 of valve stem 32 by virtue of its rigid mechanical linkage thereto. It can be further appreciated that as the piston 25 of actuator 20 causes valve stem 32 to move axially with respect to valve seat 34, the same relative axial movement will take place between magnet 150 and coil 134. In the present embodiment, the full range of travel of stem 32 and magnet 150 is about 5/16 of an inch. When valve 27 is fully closed with the conical end 33 of valve stem 32 seated flush against the upper shoulder 35 of valve seat 34, an air gap 162 of less than 10 thousandths of an inch and preferably only 1 to 2 thousandths of an inch is present between the upper face 121a of upper cap 121 and magnet 150. This gap is provided to insure that valve 27 can close fully without magnet 150 first bottoming out on end cap 121 and should be kept as small as production tolerances in the various components of gun 10 will permit. Except for the thin layer of epoxy between magnet 150 and armature 145 and the air gap 162, whose width varies according to the relative distance between stem 32 and seat 34, the flux associated with magnet 150 is provided with an otherwise substantially closed path through magnetically permeable materials. Flux from magnet 150 flows through armature 145 to piston rod 23, crosses the small airgap to the projection 131 of cap 121 and travels though the body of cap 121. The flux then crosses variable air gap 162 to return to magnet 150.

In operation, the relative axial movement between coil 134 and magnet 150, which corresponds to the relative axial movement between valve seat 34 and conical end 33 of valve stem 27 will induce a voltage across coil 134 in the form of a position-dependent velocity signal 120. Signal 120 has one polarity when valve 27 is moving closed (i.e. the distance between the stem 32 and seat 34 is decreasing.) and the opposite polarity when valve 27 is moving open (i.e. the distance between stem 32 and seat 34 is increasing). The magnitude of the position-dependent velocity signal 120 varies directly according to the relative velocity between stem 32 and seat 34. For any given valve position, signal 120 increases as velocity increases and decreases as velocity decreases. The magnitude of the position-depended velocity signal 120 also varies inversely according to the distance between stem 32 and seat 34 such that, at any given velocity, its magnitude decreases as this distance increases and, conversely, increases as it decreases. Position-dependent velocity signal 120 also has the characteristic that when the relative velocity between stem 32 and seat 34 is zero, this magnitude is also zero irrespective of valve position.

Figure 2:
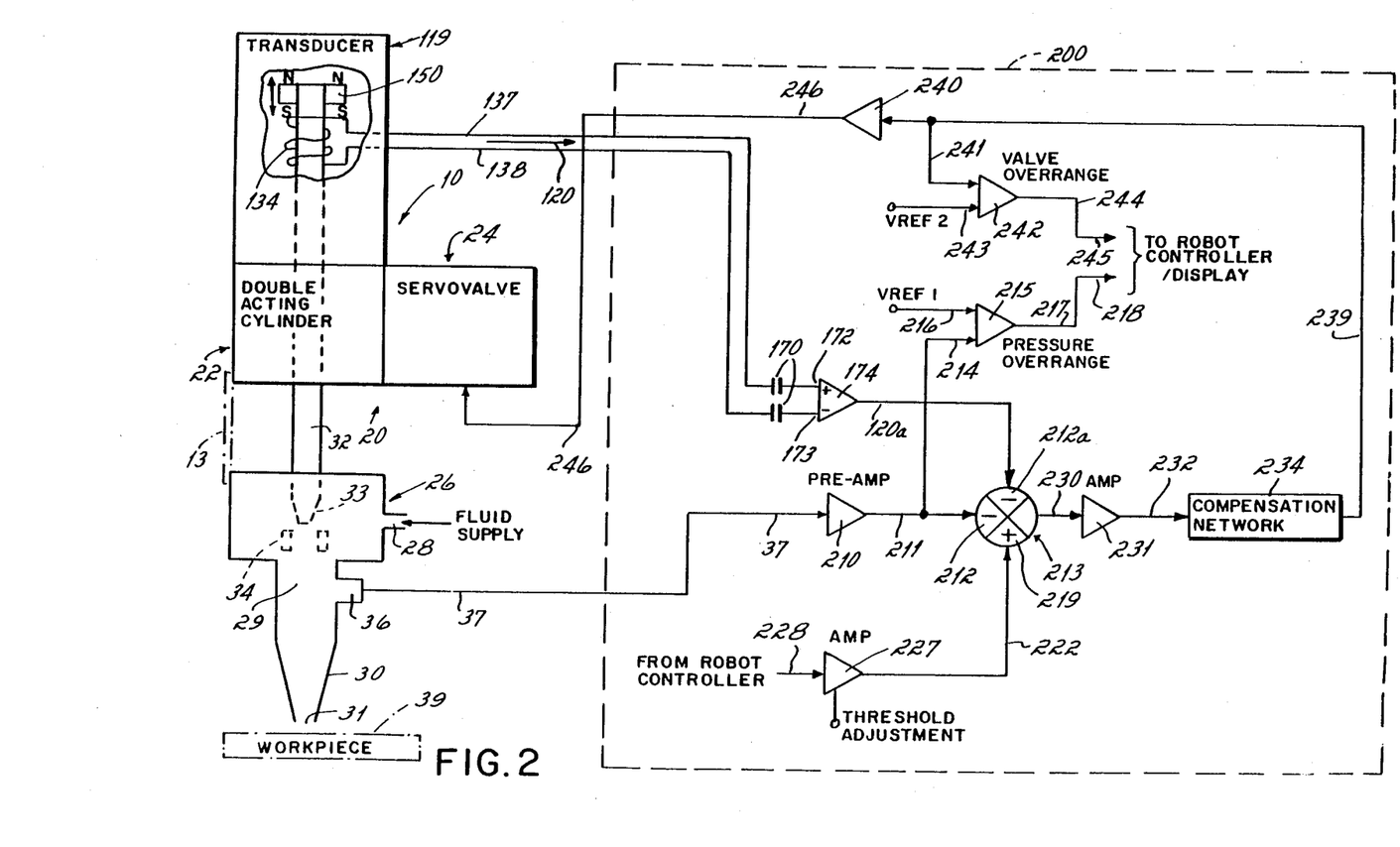
FIG. 2 is a block diagram illustrating a preferred embodiment of a system for dispensing fluid materials using position-dependent velocity feedback according to the invention.

Further according to the invention, gun 10 can be connected to an electronic controller 200 to form a fast responding closed-loop servo control system which utilizes flow rate signal 37 as a first feedback signal and position-dependent velocity signal 120 as a second feedback signal to control the rate of fluid dispensed from nozzle 29 as will be described now with reference to FIG. 2.

Dispensing gun 10 is carried by the tool mounting surface 13 of a robot having a robot controller (not shown) programmed to guide nozzle 29 over the surface of a workpiece 39 to dispense a bead of fluid thereon in a desired pattern. The metering valve assembly 26 of gun 10 is connected at its fluid inlet 28 with a continuous pressurized supply of fluid (not shown) to be dispensed onto workpiece 39. As previously described, flow rate sensor 36 continuously senses the pressure drop across nozzle 29 to generate a flow rate signal 37 correlated to the rate of flow of fluid discharged from the outlet 31 of nozzle end 30. Signal 37 is received and amplified by a preamp 210 to generate amplified flow rate signal 211. Leads 137 and 138 of the coil 134 of transducer 119 are each connected in series with a blocking capacitor 170 to filter out any D.C. component of the voltage appearing across coil 134 and then connected to the plus input 172 and minus input 173 respectively of a differential amplifier 174 to generate a single-ended position-dependent velocity signal 120a. Amplifier 174 has a fixed gain of 10 and a high input impedance as not to significantly load coil 134. Flow rate signal 211 is then fed into a minus input 212 of a summing junction 213 as a first feedback signal and position dependent velocity signal 120a algebraically summed therewith by being fed into another minus input 212a of the same summing junction 213 as a second feedback signal.

Flow rate signal 211 is also received at the minus input 212 of a summing junction 213 as well as at a first input 214 of a comparator 215 whose second input 216 receives a fixed, selectable voltage reference, VREF1 and whose output 217 generates a digital PRESSURE OVERRANGE signal 218 which is received by the robot controller. If the magnitude of output signal 211 exceeds VREF1, digital PRESSURE OVERRANGE signal assumes a logical 1 value. This can occur for example if needle valve 27 opens too far. In such event, the robot controller can be programmed to present a fault indication, shut down the system or take other appropriate action.

Summing junction 213 also includes a plus input 219 which receives a driving signal 222. In the embodiment of FIG. 2, driving signal 222 is generated by an amplifier 227 in accordance with a toolspeed signal 228 from the robot. Toolspeed signal 228 is a signal available from the robot controller and varies according to the speed of travel of gun 10 relative to workpiece 39. Through the robot controller, the gain of signal 228 can be adjusted by way of a toolspeed multiplier selected to provide a desired flow rate as a function of speed of travel.

Amplifier 227 is an operational amplifier whose gain is selected to properly scale toolspeed signal 228 so that driving signal 222 will be within a range compatible with the rest of the circuit. Amplifier 227 is preferably connected as a precision limiter such that for inputs between zero volts and an adjustable threshold voltage, the voltage of driving signal executes a decisive step in a direction proper to close needle valve 27. Typically, the threshold voltage would be adjusted so that when toolspeed signal 228 is about 50 mV or less, needle valve 27 is driven positively closed. This prevents needle valve 27 from leaking by providing a negative bias current to servovalve 24 effective to drive needle valve 27 positively closed at times when toolspeed signal 228 is either not present or is quite small.

Summing junction 213 produces an analog error signal 230 whose magnitude and polarity is equal to the algebraic difference between driving signal 222 and the sum of, flow rate signal 211 and position-dependent velocity signal 120a. Error signal 230 is received by an amplifier 231 whose gain is adjusted for optimum system stiffness. The output signal 232 from amplifier 231 is received by a compensation network 234 having an output signal 239. Compensation network 234 is designed and adjusted according to standard control techniques to stabilize closed-loop system response and maximize response speed with minimum overshoot. Signal 239 is received by a current driver 240 as well as by the first input 241 of a comparator 242.

Comparator 242 includes a second input 243 which receives a fixed, selectable voltage reference, VREF2. And an output 244 which generates a digital VALVE OVERRANGE SIGNAL 245. In the event the magnitude of signal 239 exceeds VREF2, digital VALVE OVERRANGE signal assumes a logical 1 state. Such a condition may arise for example if the supply of fluid to dispensing gun 10 is cutoff or if supply pressure is inadequate to meet the demand imposed by driving signal 222. Like PRESSURE OVERRANGE signal 218, VALVE OVERRANGE signal 245 is directed to the robot controller which may be programmed to generate a fault indication, shut the system down or otherwise initiate corrective action.

Current driver 240 generates an analog control current signal 246 which is applied to the coils 46 of servovalve 24. This causes jet pipe 52 to be diverted toward first port 60 or second port 61, depending on the magnitude and polarity of control current signal 246, to move the piston 25 of air cylinder 22 either downward or upward, respectively. Downward movement of piston 25 tends to close needle valve 27 of metering valve assembly 26 thereby reducing the flow of fluid while upward movement of piston 25 tends to open needle valve 27 thereby increasing the flow of fluid.

The polarity of flow rate signal 37 is selected such that as the magnitude of signal 37 increases, it will tend to cause control signal 246 to close the valve 27. When signal 37 decreases, its polarity is such that valve 27 tends to be driven more open by control signal 246. In a similar fashion, signal 120 is applied to amplifier 174 in such a polarity as to always tend to oppose movement of valve stem 32. That is, as stem 32 moves away from seat 34, the polarity of position-dependent velocity signal 120a should be such as to tend to cause control signal 246 to move stem 32 toward seat 34. Conversely, as valve 27 tends to close, so that stem 32 moves toward seat 34, the polarity of the position-dependent velocity signal should be such that it tends to cause control signal 246 to open valve 27.

In operation, the system functions as a closed loop servo system responsive to the pressure drop across nozzle 29 as sensed by flow rate sensor 36 as well as to the position and velocity of stem 32 relative to seat 34 as indicated by position-dependent velocity signal 120a. With needle valve 27 initially closed, no flow occurs and the pressure drop across nozzle 29 is zero. Assuming toolspeed signal 228 is less than the threshold voltage associated with amplifier 227, amplifier 227 generates a driving signal 222 of the proper polarity and of sufficient magnitude to generate a control current 246 to deflect jet pipe 52 toward first port 60. This holds piston 25 down so that needle valve 27 is held closed under force thereby preventing leakage. This condition is maintained until toolspeed signal 228 rises above the threshold voltage of amplifier 227 indicating that flow should commence. When this occurs, driving signal 222 reverses polarity. Since there is initially no flow, flow rate signal 211 is at its zero value. Since there is initially no relative movement between stem 32 and seat 34, position-dependent velocity signal 120a is also zero. Accordingly, an error signal 230 whose magnitude is determined by the difference between driving signal 222 and the sum of flow rate signal 211 and position-dependent velocity signal 120a will cause a control current 246 to be applied to coils 46 in such a polarity as to cause jet pipe 52 to deflect toward second port 61. In response, piston 25 begins to move upward causing needle valve 27 to open by lifting the conical end 33 of valve stem 32 away from valve seat 34. When this movement occurs, position-dependent velocity signal 120a assumes a non-zero value of a polarity tending to resist movement of stem 32. As the pressure signal 37 generated by pressure transducer 36 increases in response to the opening of valve 27, error signal 230 and control current 246 both tend to decrease and jet pipe 52 moves toward its null position and the magnitude of position-dependent velocity signal 120a declines toward zero. As the pressure drop across nozzle 29 approaches a steady state value corresponding to a desired flow rate, jet pipe 52 causes valve 27 to remain open by an amount just sufficient to maintain the pressure drop across nozzle 29 at that value.

When driving signal 222 changes due to a change in the relative speed between dispenser 10 and workpiece 39 or when the flow rate signal 211 changes for some other reason such as a change in viscosity of the fluid or a change in the fluid supply pressure, position-dependent velocity signal 120a operates to maintain system stability. It does so by increasing the magnitude of the feedback signal, i.e., the sum of signals 211 and 120a by an amount sufficient to insure stability without requiring a decrease in the overall loop gain. Since the amount of additional feedback depends on both the position of valve 27 and its velocity, more feedback is provided when valve 27 tends to be less stable, that is, when it operates at higher velocity and/or near the "closed" end of its range. Conversely, relatively less feedback and hence faster response time is provided when valve 27 tends to be more stable, that is, when it operates slowly and/or at more fully open positions. This permits the system to operate stably over the entire range of valve 27 at a significantly higher loop gain than would otherwise be possible. For example, it has been found that the system of FIG. 2 can operate stably over its full range with the gain of amplifier 231 set 5 times higher than the same system with position-dependent velocity signal 120a disconnected. Depending on the particular flow characteristics of the fluid being dispensed, operation at even higher gain has been found to be possible, especially with fluids which are not highly viscous or shear sensitive. These and other advantages will become apparent to one skilled in the art having the benefit of the present disclosure.

While the above description constitutes a preferred embodiment of the apparatus and method of the invention, it is to be understood that the invention is not limited thereby and that in light of the present disclosure of the invention various alternative embodiments will be apparent to persons skilled in the art. Accordingly, it is to be understood that changes can be made to the embodiments described without departing from the full legal scope of the invention which is particularly pointed out and distinctly claimed in the claims set forth below.

What is claimed is:

1. An apparatus for dispensing fluid material, comprising:
    (a) inlet means for receiving the fluid connectable to a source of fluid;
    (b) nozzle means downstream of said inlet means for discharging the fluid;
    (c) metering valve means operably disposed between said inlet means and said nozzle means, said metering valve means including a seat and a stem axially moveable relative to the seat to modulate the flow of fluid material;
    (d) actuator means connected to said metering valve means for axially shifting said valve stem relative to said valve seat;

(e) first transducer means operably connected to said nozzle means for generating a flow rate signal correlated to the rate of flow of fluid through said nozzle means; and (f) second transducer means connected to said metering valve stem for generating a position-dependent velocity signal correlated to both the velocity and the position of said stem relative said seat.

2. The apparatus of claim 1 wherein the magnitude of said position-dependent velocity signal increases as the relative velocity between said stem and said seat increases and for any given said relative velocity, said magnitude is greater when the relative distance between said stem and said seat is small than when said distance is larger.

3. The apparatus of claim 2 wherein:
said position-dependent velocity signal is zero when said relative velocity is zero.

4. The apparatus of claim 1 further comprising:
controller means having an output connected to said actuator means for applying a control signal thereto, said controller means having a first input connected to said first transducer means and a second input connected to said second transducer means whereby said control signal is correlated to said flow rate signal and said position-dependent velocity signal.

5. The apparatus of claim 4, further comprising:
driving signal generator means connected to said controller means for generating a driving signal correlated to a desired rate of flow and wherein said control signal is correlated to said flow rate signal, said position-dependent velocity signal and said driving signal.

6. The apparatus of claim 5 further comprising means for combining said driving signal, said flow rate signal and said position-dependent velocity signal so that said control signal is correlated to the difference between said driving signal and the sum of said flow rate signal and said position-dependent velocity signal.

7. The apparatus of claim 1 wherein said second transducer means comprises:
a coil, and
a magnet,
said magnet and said coil being moveable toward and away from one another, the position of said magnet being operatively fixed with respect to one of, said stem and said seat, the position of said coil being operatively fixed with respect to the other of said stem and said seat so that as said stem and said seat move toward one another, said coil is immersed further into the magnetic field associated with said magnet and as said stem and said seat move away from one another, said coil tends to be withdrawn from said magnetic field whereby said position-dependent velocity signal is generated according to the influence of said magnet upon said coil.

8. A method for controlling the flow of a fluid through a nozzle, comprising the steps of:
(a) locating a metering valve in the flow path to said nozzle, said valve and nozzle including a first member moveable relative to a second member to modulate the flow through said nozzle;
(b) generating a position-dependent velocity signal correlated to both the velocity of said first member relative to said second member and the position of said first member relative to said second member;

(c) generating a flow rate signal correlated to the rate of flow of said fluid.
(d) deriving a control signal from at least said position-dependent velocity signal, and said flow rate signal; and
(e) positioning said first member relative said second member in accordance with said control signal to control the flow of the fluid from the nozzle.

9. A method for controlling the flow of a fluid through a nozzle, comprising the steps of:
(a) locating a metering valve in the flow path to said nozzle, said valve including a first member moveable relative to a second member to modulate the flow through said nozzle;
(b) generating a position-dependent velocity signal correlated to both the velocity of said first member relative to said second member and the position of said first member relative to said second member;
(c) generating a flow rate signal correlated to the rate of the flow of the fluid;
(d) generating a driving signal;
(e) deriving a control signal from at least said position-dependent velocity signal, said flow rate signal, and said driving signal; and
(e) positioning said first member relative said second member in accordance with said control signal to control the flow of the fluid.

10. A method for controlling the flow of a fluid through a nozzle; comprising the steps of:
(a) locating a metering valve in the flow path to said nozzle, said valve including a first member moveable relative to a second member to modulate the flow through said nozzle;
(b) generating a position-dependent velocity signal correlated to both the velocity of said first member relative to said second member and to the position of said first member relative to said second member;
(c) generating a flow rate signal correlated to the rate of flow of the fluid;
(d) generating a driving signal;
(e) comparing said driving signal to the sum of said flow rate signal and said position-dependent velocity signal to derive a control signal, and
(f) positioning said first member relative said second member in accordance with said control signal to control the flow of the fluid.

11. The method of claim 8 wherein, for a given said velocity, the magnitude of said position-dependent velocity signal increases as the distance between said first member and said second member decreases.

12. An apparatus for controlling the flow of a fluid through a flow path, comprising:
(a) metering valve means, said valve means including a first member moveable relative to a second member to modulate the flow;
(b) transducer means connected to said first member of said metering valve means for generating a position-dependent velocity signal correlated to both the velocity of said first member relative to said second member and the position of said first member relative to said second member;
(c) controller means connected to said transducer means for deriving a control signal from at least said position-dependent velocity signal, and
(d) actuator means connected to said controller means and said metering valve means for positioning said first member relative said second member in accordance with said control signal to control the flow of the fluid.

13. An apparatus for controlling the flow of a fluid through a flow path:
   (a) metering valve means in the flow path, said valve means including a first member moveable relative to a second member to modulate the flow;
   (b) transducer means connected to said first member of said metering valve means for generating a position-dependent velocity signal correlated to both the velocity of said first member relative to said second member and the position of said first member relative to said second member;
   (c) flow rate sensor means operatively disposed in the flow path for generating a flow rate signal correlated to the rate of flow of the fluid;
   (d) controller means connected to said transducer means and said flow rate sensor means for deriving a control signal from at least said position-dependent velocity signal and said flow rate signal; and
   (e) actuator means connected to said controller means and said metering valve means for positioning said first member relative said second member in accordance with said control signal to control the flow of the fluid.

14. An apparatus for controlling the flow of a fluid through a flow path comprising:
   (a) metering valve means in the flow path, said valve means including a first member moveable relative to a second member to modulate the flow;
   (b) transducer means connected to said first member of said metering valve means for generating a position-dependent velocity signal correlated to both the velocity of said first member relative to said second member and the position of said first member relative to said second member;
   (c) flow rate sensor means operatively disposed in the flow path for generating a flow rate signal correlated to the rate of flow of the fluid;
   (d) controller means connected to said transducer means and said flow rate sensor means as well as to means supplying a driving signal, said driving signal being correlated to a desired flow rate, said controller means including means for deriving a control signal in accordance with the difference between said driving signal and the sum of said flow rate signal and said position-dependent velocity signal;
   (e) actuator means connected to said controller means and said metering valve means for positioning said first member relative said second member in accordance with said control signal to control the flow of the fluid.

* * * * *

UNITED STATES PATENT AND TRADEMARK OFFICE
CERTIFICATE OF CORRECTION

PATENT NO.   :   4,842,162
DATED        :   June 27, 1989
INVENTOR(S)  :   Stephen L. Merkel It is certified that error appears in the above-identified patent and that said Letters Patent is hereby corrected as shown below:

Column 1, line 34, insert --.-- after "length" and before "In".

Column 2, line 13, insert --.-- after "rate" and before "In".

Column 4, line 3, insert --.-- after "velocity" and before "Further".

Column 6, line 37, the "0" in "0-ring" should be the letter "O", not zero, and should not be in bold print.

Column 9, line 2, the numeral "10" should not be in bold print.

Column 11, line 1, the numeral "1" should not be in bold print.

Signed and Sealed this

Fifteenth Day of January, 1991

*Attest:*

HARRY F. MANBECK, JR.

*Attesting Officer*        *Commissioner of Patents and Trademarks*